US009225895B2

(12) United States Patent
Kozinski

(10) Patent No.: US 9,225,895 B2
(45) Date of Patent: Dec. 29, 2015

(54) AUTOMATIC FOCUSING METHOD AND APPARATUS FOR SAME

(71) Applicant: Samsung Electronics Co., Ltd, Gyeonggi-do (KR)

(72) Inventor: Dawid Kozinski, Piaseczno (PL)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/152,803

(22) Filed: Jan. 10, 2014

(65) Prior Publication Data

US 2014/0293112 A1  Oct. 2, 2014

(30) Foreign Application Priority Data

Mar. 29, 2013  (KR) .................. 10-2013-0034842

(51) Int. Cl.
*H04N 5/232* (2006.01)
*G02B 7/28* (2006.01)
*G02B 27/00* (2006.01)

(52) U.S. Cl.
CPC ............ *H04N 5/23212* (2013.01); *G02B 7/287* (2013.01); *G02B 27/0093* (2013.01); *H04N 5/23293* (2013.01)

(58) Field of Classification Search
CPC ........... H04N 5/23212; H04N 5/23293; G02B 27/0093; G02B 7/287; A61B 3/113; A61B 3/117–3/1176; A61B 8/10; A61B 5/04–5/0496; G01S 11/12; G01S 11/14; G01C 3/00–3/32
See application file for complete search history.

(56) References Cited

U.S. PATENT DOCUMENTS

| 47,489 A | 4/1865 | Colby |
| 3,936,849 A | 2/1976 | Tsujimoto |
| 4,170,225 A | 10/1979 | Criglar et al. |
| 4,574,314 A | 3/1986 | Weinblatt |
| 4,974,010 A | 11/1990 | Cleveland et al. |
| 5,139,022 A | 8/1992 | Lempert |
| 5,422,700 A | 6/1995 | Suda et al. |
| 5,720,619 A | 2/1998 | Fisslinger |
| 5,771,121 A | 6/1998 | Hentschke |
| 6,097,892 A | 8/2000 | Saito |
| 6,361,495 B1 | 3/2002 | Grolman |
| 6,623,427 B2 | 9/2003 | Mandigo |
| 7,298,414 B2 | 11/2007 | Stavely et al. |
| 2002/0193674 A1 | 12/2002 | Fleischman et al. |

(Continued)

FOREIGN PATENT DOCUMENTS

| EP | 0 680 723 A2 | 11/1995 |
| EP | 1637975 A1 | 3/2006 |

(Continued)

OTHER PUBLICATIONS

Extended European Search Report dated Jul. 22, 2014 in connection with European Application No. 14152810.9, 8 pages.

(Continued)

*Primary Examiner* — Paul Berardesca

(57) ABSTRACT

Disclosed are an automatic focusing method which can automatically set a focus according to a change in an eyeball of a user and an apparatus for the same. The automatic focusing method includes generating distance data by calculating a distance from an eyeball of a user to a focus corresponding to a position at which the eyeball of the user looks; and determining, based on the distance data, a plane of focus including the focus.

20 Claims, 10 Drawing Sheets

(56) References Cited

U.S. PATENT DOCUMENTS

| | | |
|---|---|---|
| 2003/0025996 A1 | 2/2003 | Andrews et al. |
| 2006/0123018 A1 | 6/2006 | Ashok et al. |
| 2006/0232665 A1* | 10/2006 | Schowengerdt et al. ....... 348/51 |
| 2008/0080852 A1 | 4/2008 | Chen et al. |
| 2008/0218589 A1 | 9/2008 | Visser et al. |
| 2010/0130888 A1* | 5/2010 | Deacon et al. ................ 600/587 |
| 2010/0149073 A1* | 6/2010 | Chaum et al. .................... 345/8 |
| 2011/0208060 A1 | 8/2011 | Haase et al. |
| 2014/0022505 A1* | 1/2014 | Pugh et al. ............... 351/159.03 |

FOREIGN PATENT DOCUMENTS

| | | |
|---|---|---|
| EP | 2 314 201 A1 | 4/2011 |
| GB | 2 126 745 A | 3/1984 |
| JP | 2-279164 A | 11/1990 |
| JP | 09-197495 | 7/1997 |
| JP | 10-221591 | 8/1998 |
| JP | 2001-290101 | 10/2001 |
| JP | 2009-285322 | 12/2009 |
| WO | WO 90/02518 A1 | 3/1990 |
| WO | WO 97/08985 A1 | 3/1997 |
| WO | WO 01/57582 A1 | 8/2001 |
| WO | WO 2007/005913 A2 | 1/2007 |
| WO | WO 2007/035689 B1 | 12/2007 |
| WO | WO 2012/000164 A1 | 1/2012 |

OTHER PUBLICATIONS

Kozinski, D., "Biofeedback apparatus and method thereof," Samsung Electronics Co., LTD, 2010, 27 pages.

The Anstendig Institute, The Flaw in All Auto-Focusing Cameras: or Why Auto-Focusing Can Never Achieve True Accuracy With Most Subjects, 1985, 5 pages.

"How to Focus a Digital SLR," The Digital SLR Guide, Oct. 20, 2012, 5 pages.

Kim, E., "Is Manual Focus or Autofocus Better for Street Photography?" Mar. 21, 2011, 11 pages.

"Auto Focus"; retrieved from http://www.cs.mtu.edu/~shene/DigiCam/User-Guide/5700/AUTO-FOCUS/Auto-Focus.html; Jan 12, 2004; 3 pages.

Haparnus, Z.; "How Does the Camera Auto Focus Work and Why Sometimes It Fails?"; ezinearticles.com/?How-Does-the-Camera-Auto-Focus-Work-and-Why-Sometimes-It-Fails?&id=135414; Jan 27, 2006; 3 pages.

\* cited by examiner

AUTOMATIC FOCUSING METHOD AND APPARATUS FOR SAME

CROSS-REFERENCE TO RELATED APPLICATION(S) AND CLAIM OF PRIORITY

The present application is related to and claims the priority under 35 U.S.C. §119(a) to Korean Application Serial No. 10-2013-0034842, which was filed in the Korean Intellectual Property Office on Mar. 29, 2013, the entire content of which is hereby incorporated by reference.

TECHNICAL FIELD

The present disclosure relates generally to an apparatus and a method for automatically setting a focus, and more particularly, to an automatic focusing method which can automatically set a focus according to a change in a user's eyeball and an apparatus for the same.

BACKGROUND

Modern camera devices support an Auto Focusing (AF) detection function which is a function of automatically adjusting a focus. However, the AF detection function has various problems. For example, when a subject to be focused is partially hidden by another object located closer to a camera lens in comparison with the subject, it is difficult for a camera to detect the main subject through the AF detection function. Further, when a user photographs with a low light level, the camera cannot recognize a difference between the main subject and other objects and thus sometimes cannot detect the main subject through the AF detection function. Moreover, when the main subject is an object that absorbs infrared light, the camera cannot properly measure a distance between the main subject and the camera through the AF detection function. In addition, when the user photographs an object having a low contrast, for example, a white wall, sky or the like, the camera cannot detect a focus through the AF detection function.

When the user wants to photograph by using camera equipment, the user manually or automatically set the focus. In general, the focus is set to the object selected by the user in an automatic mode. It is preferable that the object is generally located within a small square of a center area of a frame, that is, a particular area of the frame. In another setting method, a camera apparatus temporarily provides a plurality of areas for a focus setting to the user and the user sets the focus by selecting one of the plurality of areas. Thereafter, the user can half press a shutter button of the camera apparatus to focus a lens on the selected object. Even though the frame leaves a position of the selected object, when the user maintains the action of half pressing the shutter button, it is difficult to re-focus. When the user more heavily presses the shutter button, an action follows of taking a picture in a state where the selected object is focused. As described above, the AF function of the camera apparatus requires close attention of the user.

The general AF function is performed by the camera apparatus based on a contrast value of an image input through the lens. When a scene or area used to focus does not have reasonable contrast, the AF can fail. Such a phenomenon sometimes occurs when photographing is performed in the dark or when large and flat planes having similar colors are photographed. Further, when the subject is not located in the center of the frame, performance of the AF function can have an error. When the subject, that is, the selected object is partially or entirely hidden by objects located closer to the camera apparatus, the camera apparatus cannot perform the AF function and the user should directly set the focus manually.

SUMMARY

To address the above-discussed deficiencies of the prior art, it is a primary object to provide an automatic focusing method which can automatically set a focus according to a change in a user's eyeball and an apparatus for the same.

In accordance with an aspect of the present disclosure, an automatic focusing method is provided. The automatic focusing method includes generating distance data by calculating a distance from an eyeball of a user to a focus corresponding to a position at which the eyeball of the user looks; and determining, based on the distance data, a plane of focus including the focus.

In accordance with another aspect of the present disclosure, an automatic focusing apparatus is provided. The automatic focusing apparatus includes an eyeball measurement unit configured to detect a change generated in an eyeball of a user; and a controller configured to generate distance data by calculating a distance from the eyeball of the user to a focus corresponding to a position at which the eyeball of the user looks, and determine, based on the distance data, a plane of focus including the focus.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
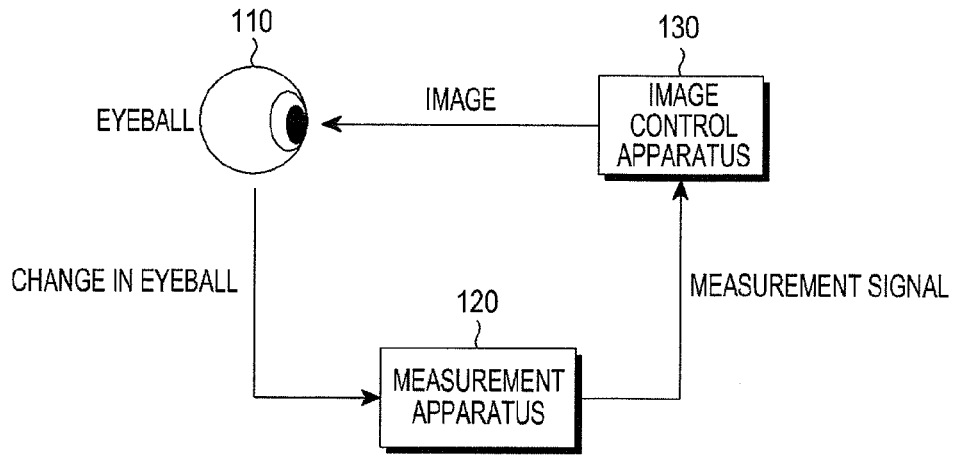
FIG. 1 is a diagram illustrating a focusing system including an automatic focusing apparatus according to embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Hereinafter, certain embodiments of the present disclosure will be described in detail with reference to the accompanying drawings. In the following description, although the present disclosure has described the specific matters such as concrete components, the limited embodiments, and the drawings, they are provided merely to assist general understanding of the present disclosure and the present disclosure is not limited to the embodiments. Various modifications and changes can be made from the description by those skilled in the art.

A Method of Automatically Focusing a Camera Apparatus

Certain embodiments of the present disclosure includes a method of automatically focusing optical mechanisms, particularly, digital SLR cameras. According to the first embodiment, an automatic focusing method and apparatus according to the present disclosure can provide a Human-Machine Interface (HMI).

When the user wants to photograph by using the camera apparatus, the user manually or automatically set a focus. In general, the focus is set on the object selected by the user in an automatic mode. It is preferable that the object is generally located within a small square of a center area of a frame, that is, a particular area of the frame. In another setting method, the camera apparatus temporarily provides a plurality of areas for a focus setting to the user and the user sets the focus by selecting one of the plurality of areas. Thereafter, the user can half press a shutter button of the camera apparatus to focus a lens on the selected object. When the frame leaves a position of the selected object, it is difficult to re-focus if the user maintains the action of half pressing the shutter button. When the user more heavily presses the shutter button, an action follows of taking a picture in a state where the selected object is focused. As described above, the AF function of the camera apparatus requires close attention of the user.

The general AF function is performed by the camera apparatus based on a contrast value of an image input through the lens. When a scene or area used to focus does not have reasonable contrast, the AF can fail. Such a phenomenon sometimes occurs when photographing is performed in the dark or when large and flat planes having similar colors are photographed. Further, also when the subject is not located in the center of the frame, performance of the AF function can have an error. When the subject or selected object is partially or entirely hidden by objects located closer to the camera apparatus, the camera apparatus cannot perform the AF function and the user should directly set the focus manually.

A solution according to the present disclosure generally corresponds to a method of controlling a function of a digital Single Lens Reflex (SLR) camera, which uses a human's eyeball control mechanism to focus. In certain embodiments of the present disclosure, a miniaturized electromyogram sensor and/or ultrasonographic sensors can be mounted within the camera apparatus as a part of a viewfinder structure. The electromyogram sensor and/or ultrasonographic sensors can measure parameters associated with a control of a human's eyeball, for example, an electrical activity of a ciliary muscle and/or a thickness of a crystalline lens. Based on the fact that the eyeball maintains a proper focus through self-control, the camera apparatus can generate a control signal for focusing the camera apparatus based on the measured parameters, for example, a value measured using the electromyogram sensor or a value measured using the ultrasonographic sensor. The control signal can be used as a basis for controlling the camera lens or change an image provided to the user through the viewfinder, that is, an image viewed by the user. The control method can be continuously performed by a biofeedback loop shown in FIG. 1 below.

As easily understood by those skilled in the art, embodiments of the present disclosure can be expanded and applied to different kinds of optical equipment fields. Particularly, embodiments of the present disclosure can be implemented to be applied to devices for registering and observing an image including cameras, camcorders, microscopes, medical equipment, telescopes, binoculars and the like. Further, according to another embodiment, the method and apparatus according to the first embodiment can be applied to fields such as photography, microscopic observations, medicine, astronomy and the like.

A Method of Automatically Focusing Display Devices

Certain embodiments of the present disclosure can provide a new and distinctive user experience. By providing an adaptive human-machine interaction certain embodiments can provide much more pleasure to the user whenever the user watches a movie, plays a game, and controls graphical user interfaces.

Certain embodiments are designed to allow a display device, particularly, a 3D display device to achieve a deep depth of field effect of the image. As the display device selects a plane (hereinafter, referred to as a plane of focus) of the focus based on an accommodative ability of the human's eyeball according to the second embodiment, a dynamic depth of field effect can be provided to the user. According to the present disclosure, the plane of focus is an area including the focus, and can be a line or plane perpendicular to a line generated by connecting the user's eyeball and the focus. Further, in the present disclosure that the user recognizes an object included in the plane of focus based on the focus in a most clear shape.

Also, the display device according to the present disclosure can be designed to include the electromyogram sensor and the ultrasonographic sensors like the camera apparatus of certain embodiments. The display device receives a signal having measured a change in a crystalline lens or a ciliary muscle included in the user's eyeball. The display device provides a plane of focus "requested" by the eyeball to the user according to the received signal. There are known methods of recording a video by using multiple planes of focus. Further, there are known methods of expressing 3D images according to one of the planes of focus. However, a biofeedback which reflects a reaction of the eyeball according to the present disclosure has not been known. The display device according to the second embodiment is expected to provide better user experience to the user ("absorbed in" that scene). Such an effect is expected to reduce eye strain of the user and mitigate a problem generated according to a distance between an observer, that is, the user and the screen, for example, a phenomenon in which image signals are displayed to overlap each other.

Certain embodiments of the present disclosure, the miniaturized electromyogram sensor and ultrasonographic sensors can be mounted within the display device as a part of glasses according the present disclosure. The electromyogram sensor and/or the ultrasonographic sensor can measure parameters related to a control of a human's eyeball, for example, an electrical activity of a ciliary muscle and/or a thickness of a crystalline lens. Based a human's eyeball maintaining a proper focus by itself, the display device converts the measured parameters to control signals. The control signal can be used as a basis for controlling the camera lens or change an image provided to the user through the viewfinder and viewed by the user. The control method can be continuously performed by a biofeedback loop of the focusing system shown in FIG. 1 like the first embodiment.

Particularly, a feature of the approach according to the present disclosure is that the user's eyeball affects an image displayed in the screen. The above matter can be maintained even though the user interfaces adopted by the present disclosure are different.

Certain embodiments have two main operation modes. The first operation mode is to enhance illusion according to depth perception and the second operation mode is to expose an object of interest.

As easily understood by those skilled in the art, the described embodiments of the present disclosure can be expanded and applied to fields of digital television, movies, computer games, virtual reality, designing tools, visualization, medical imaging, image guided surgery, simulators, training devices and the like.

Particularly, certain embodiments of the present disclosure can be implemented to control a new 3D based user interface. For example, the 3D based user interface which can be designed according to the present embodiment can support image-guided surgery by selecting (or highlighting) anatomical structures having different depths of field within a body. One or more surgeons can easily know utilization results of surgical equipment by wearing semi-translucent glasses.

According to another embodiment, the present disclosure allows a person who describes a 3D medical image to use the display device according to the present disclosure to dynamically change image parameters (for example, Hounsfield scale) according to tissue under the observation.

According to still another embodiment, the user of a computer system having the graphical user interface according to the present disclosure can dynamically select windows, widgets, or applications without using both hands, and dynamically move at least one selected from the windows, the widgets, and the applications.

The methods proposed by the present disclosure can be applied to stereoscopic image presentation systems, and the stereoscopic image presentation systems include digital television, computer vision, entertainment, medical equipment and systems, cinematography and movie industries, education, computer aided design, graphical user interfaces and the like, and also other fields which have not been found other than the above fields of the stereoscopic image presentation systems.

Hereinafter, certain embodiments of the present disclosure will be described in detail with reference to the accompanying drawings. In the following description, although the present disclosure has described the specific matters such as concrete components, they are provided merely to assist general understanding of the present disclosure. It is apparent to those skilled in the art that predetermined modifications and changes can be made without departing from the scope of the present disclosure.

FIG. 1 is a diagram illustrating a focusing system including an automatic focusing apparatus according to embodiments of the present disclosure.

Referring to FIG. 1, the focusing system can include an eyeball 110 of a user, a measurement apparatus 120, and an image control apparatus 130. According to an embodiment, the measurement apparatus 120 can be implemented to include the image control apparatus 130.

An image observed by the eyeball 110 of the user can be modified or changed by the image control apparatus 130. The eyeball 110 automatically focuses on an object of interest of the user. A focusing process can be performed by changing parameters (eyeball parameters) related to the eyeball 110. Particularly, due to an activity of the ciliary muscle of the eyeball 110, a thickness of the crystalline lens (eye lens) is changed and thus the focus is controlled. The measurement apparatus 120 is an apparatus that generates a signal for setting the focus, and can include, for example, at least one of an electromyogram (EMG) sensor or an ultrasonographic sensor. In certain embodiments, the measurement apparatus 120 can perform a random method applicable to acquire a signal related to the focusing.

The image control apparatus 130 can perform calibration and scaling of the output image A measurement signal output from the measurement apparatus 120 is fed back to the image control apparatus 130.

The user, that is, the human sets the focus by the eyeball 110 by changing a shape of the crystalline lens, that is, by changing a shape of the ciliary muscle. As already described above, in a case of the human, the ciliary muscle changes a shape of the flexible crystalline lens of the eyeball 110. The ciliary muscle tightens or loosens ligaments concentrically connected with edges of the crystalline lens and thus affects oblateness of the crystalline lens. When the crystalline lens is flattened as the ciliary muscle relaxes and thus tightens the ligaments, the human can focus the eyeball 110 on a remote object. When the crystalline lens is rounded out as the ciliary muscle contracts and thus loosens the ligaments, the human can focus the eyeball 110 on a close object.

Optical parameters of the eyeball 110 include electrical activities of muscles included in the eyeball 110 and signals related to the parameters, and can be detected by the measurement apparatus 120 of the automatic focusing system. Particularly, the measurement apparatus 120 according to the present embodiment can measure oblateness of the crystalline lens.

There already have been solutions to measure the electrical activity of the ciliary muscle by using the EMG scheme, that is, the electromyogram sensor. The electromyogram sensor detects and processes the electrical activity of the ciliary muscle. The electromyogram sensor can determine a degree of the oblateness of the crystalline lens by using an electrical signal generated due to the activity of the ciliary muscle.

There also have been solutions to measure a shape of the crystalline lens by using the USG scheme, that is, the ultrasonographic sensor. The ultrasonographic sensor can photograph a shape of the contracted or relaxed crystalline lens and estimate the degree of the oblateness of the crystalline lens based on images acquired by the photographing.

Also, it is apparent to those skilled in the art that the EMG scheme and the USG scheme can be combined. A method of measuring a structure of the eyeball 110 based on a laser in a similar way to that of the technical contents disclosed in U.S. Pat. No. 5,139,022A (title: METHOD AND APPARATUS FOR IMAGING AND ANALYSIS OF OCULAR TISSUE) can be also considered in the present disclosure.

It is apparent to those skilled in the art that the automatic focusing method can be implemented in a similar way to solutions known in optometry. In the following illustrative embodiment, a plurality of versions having focuses differently selected in predefined scenes can be shown to an observer, i.e., the user. The signal related to the focusing of the eyeball 110, for example, is a measurement signal measured by the measurement apparatus 120 for each scene output by the image control apparatus 130 or stored in the image control apparatus 130. In certain embodiments, the measurement for the eyeball 110 can be continuously performed by the measurement apparatus 120, and accordingly, the image output from the image control apparatus 130 can be continuously changed.

Figure 2:
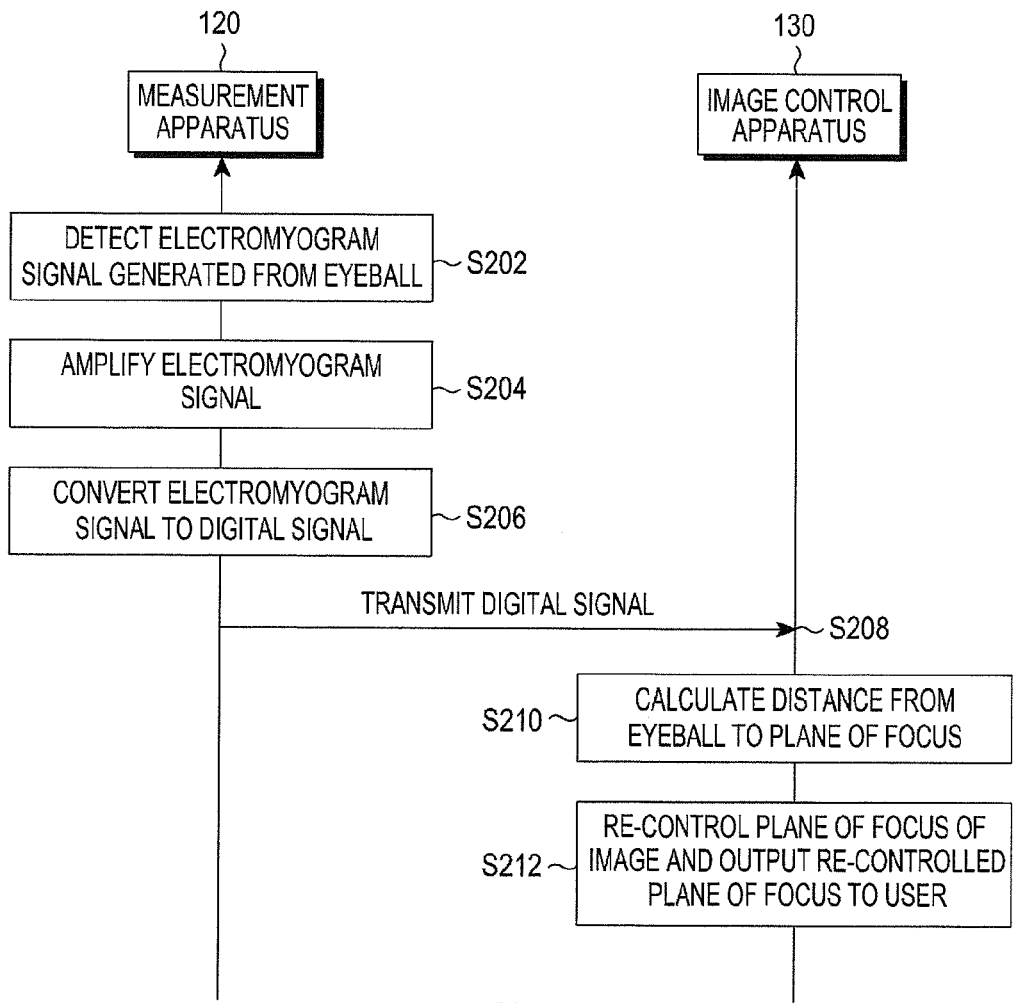
FIG. 2 is a flowchart illustrating an example of an automatic focusing method in a focusing system.

FIG. 2 is a flowchart illustrating an example of an automatic focusing method in a focusing system, such as the focusing system shown in FIG. 1. In FIG. 2, it is assumed that the measurement apparatus 120 is implemented to include the electromyogram sensor.

Referring to FIG. 2, the measurement apparatus 120 detects an electromyogram signal generated from the eyeball 110 of the user in step S202. As already described above, the crystalline lens included in the eyeball 110 contracts or relaxes according to a motion of the ciliary muscle. In the present embodiment, an electrical signal generated when the ciliary muscle moves to control a thickness of the crystalline lens as described above is referred to as an electromyogram signal for convenience of the description.

The measurement apparatus 120 amplifies the electromyogram signal in step S204, and converts the amplified electromyogram signal to a digital signal in step S206. According to an embodiment, the measurement apparatus 120 can amplify and filter the electromyogram signal in step S204, and convert the electromyogram signal having a form of an analog signal to a signal having a form of a digital signal in step S206.

The measurement apparatus 120 transmits the electromyogram signal converted to the digital signal to the image control apparatus 130 in step S208. The image control apparatus 130 calculates a distance from the eyeball 110 of the user to a plane of focus by using the digital signal received from the measurement apparatus 120 in step S210. When the distance from the eyeball 110 to the plane of focus is calculated, the image control apparatus 130 adjusts the plane of focus of the image and outputs the adjusted plane of focus to the user in step S212. The plane of focus refers to a plane where the focus exists and is shown to the user in a form of a most clear plane. In the present embodiment, it is preferable that the image control apparatus 130 most clearly displays the plane of focus of the 3D image. For example, the focus set by the image control apparatus 130 before performance of the operation of FIG. 2 is a plane (first plane of focus) 10 cm behind in comparison with the focus set by the eyeball 110 of the user. The image control apparatus 130 calculates a plane where the focus set by the eyeball 110 is located in step S210. Accordingly, the image control apparatus 130 detects that the focus set by the eyeball 110 is located 10 cm in front of the first plane of focus. The image control apparatus 130 resets the focus of the image output through the image control apparatus 130 to be 10 cm forward, and most clearly displays a plane (second plane of focus) including the new focus. Accordingly, the user can receive the image accurately focused on a desired position from the image control apparatus 130.

According to an embodiment, the measurement apparatus 120 can perform the operation in step S210, that is, calculate the distance from the eyeball 110 to the plane of focus. As described above, when the measurement apparatus 120 calculates the distance from the eyeball 110 to the plane of focus, the measurement apparatus 120 can transmit data (hereinafter, referred to as distance data) including the calculated distance value to the image control apparatus 130. The image control apparatus 130 having received the distance data from the measurement apparatus 120 can adjust the plane of focus of the image and output the adjusted plane of focus to the user.

Figure 3:
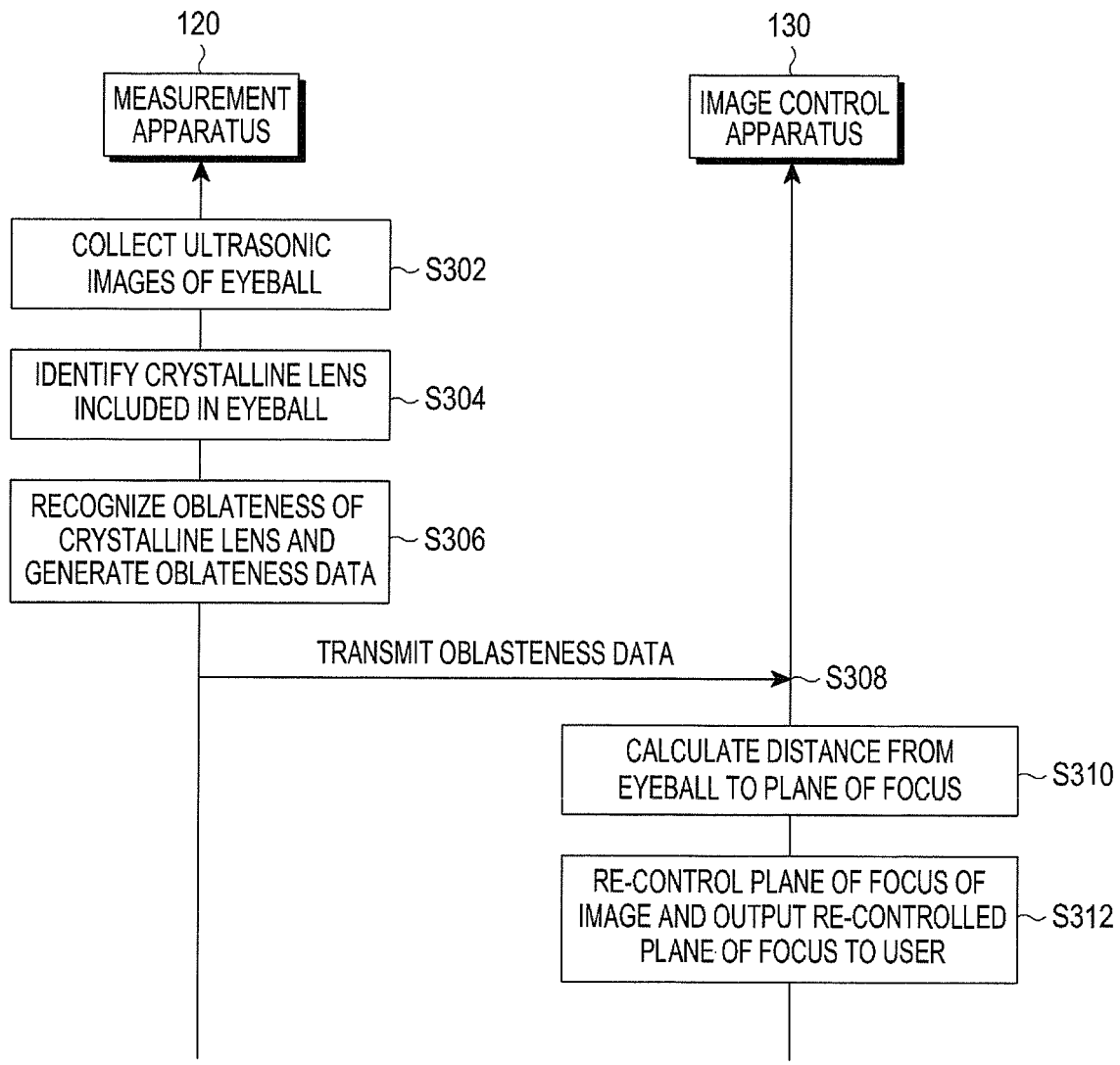
FIG. 3 is a flowchart illustrating an automatic focusing method in a focusing system.

FIG. 3 is a flowchart illustrating an automatic focusing method in a focusing system, such as the focusing system shown in FIG. 1. In FIG. 3, it is assumed that the measurement apparatus 120 is implemented in a form including the ultrasonographic sensor.

Referring to FIG. 3, the measurement apparatus 120 performs ultrasonic imaging for the eyeball 110 of the user, and collects ultrasonic images as a result thereof in step S302. According to an embodiment, the measurement apparatus 120 can perform the ultrasonic imaging for the eyeball 110 of the user to collect ultrasonic images of the eyeball 110.

The measurement apparatus 120 identifies the crystalline lens included in the eyeball 110 of the user based on the images collected in step S302 in step S304. When the crystalline lens is identified, in step S306, the measurement apparatus 120 recognizes an oblateness of the crystalline lens based on the images collected in step S302. The measurement apparatus 120 transmits data (hereinafter, referred to as oblateness data) indicating the oblateness of the crystalline lens detected in step S306 to the image control apparatus 130 in step S308. The image control apparatus 130 calculates a distance from the eyeball 110 of the user to a plane of focus based on the oblateness data transmitted from the measurement apparatus 120 in step S310. When the distance from the eyeball 110 to the plane of focus is calculated, the image control apparatus 130 adjusts the plane of focus of the image and outputs the adjusted plane of focus to the user in step S312.

In certain embodiments, the measurement apparatus 120 can perform the operation in step S310 and calculate the distance from the eyeball 110 to the plane of focus. As described above, when the measurement apparatus 120 calculates the distance from the eyeball 110 to the plane of focus, the measurement apparatus 120 can transmit distance data including the calculated distance value to the image control apparatus 130.

According to another embodiment, the measurement apparatus 120 can transmit the ultrasonic images collected in step S302 to the image control apparatus 130. The image control apparatus 130 can detect an oblateness of the crystalline lens based on the ultrasonic images. Further, the image control apparatus 130 can generate data including the oblateness of the crystalline lens, also referred to as oblateness data, similar to the measurement apparatus 120. Thereafter, the image control apparatus 130 calculates the distance from the eyeball 110 of the user to the plane of focus based on the oblateness data. When the distance from the eyeball 110 to the plane of focus is calculated, the image control apparatus 130 can adjust the plane of focus and output the adjusted plane of focus to the user like in step S312.

Figure 4:
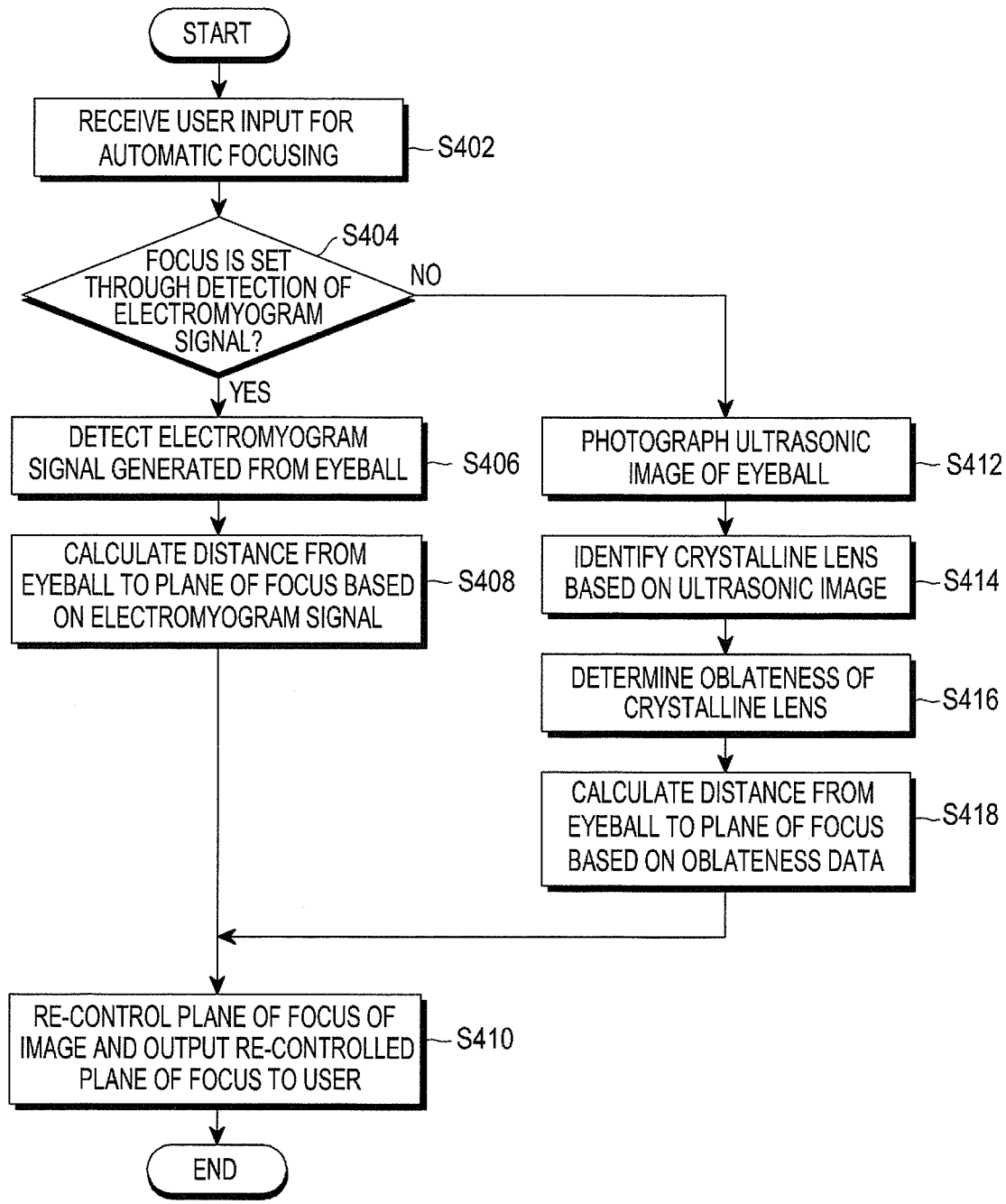
FIG. 4 is a flowchart illustrating an automatic focusing method in a focusing system.

FIG. 4 is a flowchart illustrating an automatic focusing method in a focusing system, such as the focusing system shown in FIG. 1. In FIG. 4, it is assumed that the measurement apparatus 120 is implemented to include both of the electromyogram sensor and the ultrasonographic sensor and an operation in FIG. 4 is performed by an automatic focusing apparatus implemented as one apparatus generated by combining the measurement apparatus 120 and the image control apparatus 130.

Referring to FIG. 4, the automatic focusing apparatus receives a user input for the automatic focusing in step S402. The automatic focusing apparatus according to the present embodiment can receive a user input for the automatic focusing. Further, the automatic focusing apparatus can perform an operation for automatically setting or resetting the focus according to the user input.

According to an embodiment, the automatic focusing apparatus can be implemented by a camera apparatus. When the user approaches his or her eyeball 110 to the viewfinder 522, the automatic focusing apparatus implemented by the camera apparatus can recognize the approach of the eyeball 110 as the user input.

According to another embodiment, the automatic focusing apparatus can be implemented by a 3D image display device that provides a stereoscopic image to the user. When it is detected that the user is located in a front side of a screen of the 3D image display device, the 3D image display device considers that the user makes a request for an automatic focusing operation to set or reset the focus. At this time, the 3D image display device can include a camera or an infrared ray sensor for detecting whether the user is located in the front side of the screen.

As described above, when the user input for automatically setting the focus is received, the automatic focusing apparatus determines whether to set the focus through a detection of an electromyogram signal in step S404. In the present embodiment, the automatic focusing apparatus can predetermine whether to set the focus by using the electromyogram sensor or the ultrasonographic sensor.

When the focus is set through the detection of the electromyogram signal as a result of the determination in step S404 (S404: yes), the automatic focusing apparatus detects the electromyogram signal generated from the eyeball 110 of the user in step S406. The focusing apparatus calculates a distance from the eyeball to a plane of focus based on the electromyogram signal in step S408. The focusing apparatus adjusts the plane of focus of the image based on the distance value calculated in step S408 and outputs the adjusted distance value to the user in step S410.

When the focus is not set through the detection of the electromyogram signal as a result of the determination in step S404 (S404: no), the focusing apparatus photographs ultrasonic images of the eyeball 110 of the user in step S412. The focusing apparatus identifies the crystalline lens included in the eyeball 110 of the user based on the ultrasonic images in step S414. When the crystalline lens is identified, the focusing apparatus determines oblateness of the crystalline lens based on the ultrasonic images in step S416. The focusing apparatus can generate oblateness data indicating the oblateness of the crystalline lens in step S416. The automatic focusing apparatus calculates the distance from the eyeball 110 to the plane of focus based on the oblateness data in step S418. The automatic focusing apparatus adjusts the plane of focus of the image based on the distance value calculated in step S418 and outputs the adjusted plane of focus to the user in step S420.

Figure 5:
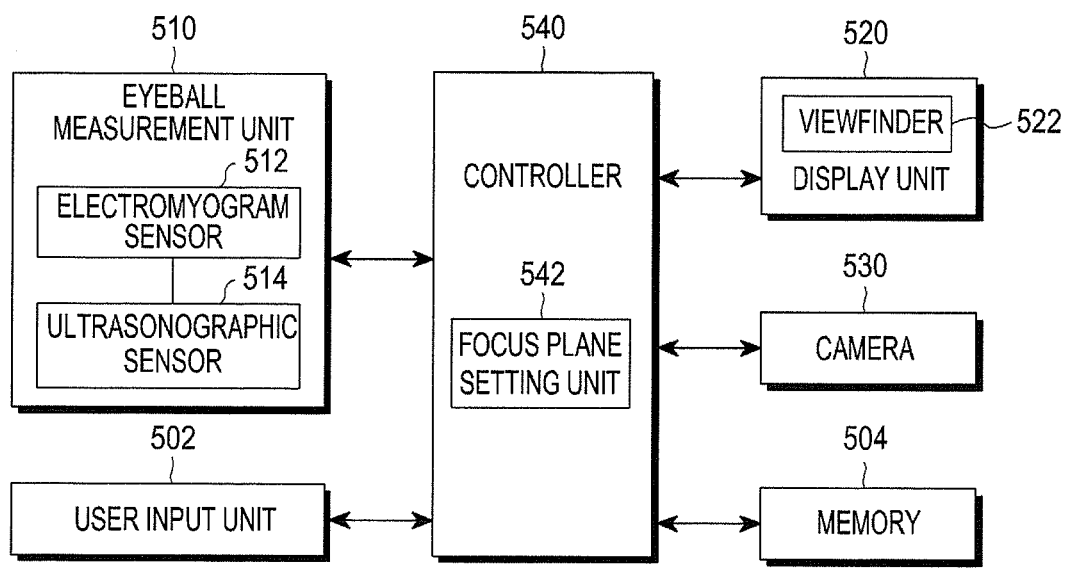
FIG. 5 is a block diagram illustrating a configuration of a focusing apparatus in a focusing system.

FIG. 5 is a block diagram illustrating a configuration of a focusing apparatus in a focusing system, such as the focusing system shown in FIG. 1. It is assumed that a focusing apparatus 500 of FIG. 5 is implemented to include both of the measurement apparatus 120 and the image control apparatus 130.

Referring to FIG. 5, the focusing apparatus 500 can include an eyeball measurement unit 510, a display unit 520, and a controller 540 and further include a user input unit 502, a memory 504, and a camera 530.

The user input unit 502 receives a user input received from the user. The user input unit 502 according to the present embodiment can receive a user input for automatically setting the focus. The user input unit 502 can receive a user input for displaying a 2D image or a 3D image through the display unit 520.

The memory 504 stores various data for controlling operations of the focusing apparatus 500. In the present embodiment, the memory 504 can store an image displayed by the display unit 520. Further, the memory 504 can store status data indicating whether the focusing apparatus 500 is currently set to control the plane of focus by using the electromyogram sensor or reset to control the plane of focus by using the ultrasonic image.

The eyeball measurement unit 510 detects a change generated in the eyeball 110 of the user using the focusing apparatus 500. Particularly, the eyeball measurement unit 510 can include at least one of an electromyogram sensor 512 and an ultrasonographic sensor 514 for measuring the change in the eyeball 110 (for example, change in the oblateness of the crystalline lens). Further, the eyeball measurement unit 510 can detect the change in the eyeball 110 by using one of the electromyogram sensor 512 and the ultrasonographic sensor 514.

The electromyogram sensor 512 detects an electromyogram signal generated from the eyeball 110. The ultrasonographic sensor 514 photographs an image of the eyeball 110 and generates an ultrasonic image. In certain embodiments, the ultrasonographic sensor 514 can perform ultrasonic imaging of the eyeball 110 periodically (for example, 0.1 seconds) to be stored in the memory 504.

The crystalline lens included in the eyeball 110 relaxes or contracts according to a motion of the ciliary muscle connected with the crystalline lens. For example, when the ciliary muscle contracts, the crystalline lens is thickened (expanded). When the ciliary muscle relaxes, the crystalline is thinned (contracted). As described above, whenever the ciliary muscle relaxes or contracts, a value of an action potential applied to the ciliary muscle is changed. The electromyogram sensor 512 according to the present embodiment detects the applied action potential according to the relaxing or contracting of the ciliary muscle as the electromyogram signal. For example, a voltage in level 1 is applied to the ciliary muscle when the ciliary muscle relaxes, and a voltage in level 10 is applied to the ciliary muscle when the ciliary muscle contracts. The electromyogram sensor 512 can detect the contracting or relaxing of the ciliary muscle by detecting the voltage in level 1 or level 10.

When the electromyogram signal is detected by the electromyogram sensor 512, the eyeball measurement unit 51 can convert the electromyogram signal to a digital signal and transmit the digital signal to the controller 540. According to an embodiment, the eyeball measurement unit 510 can calculate a distance from the eyeball 110 of the user to the focus or plane of focus based on the electromyogram signal and generate distance data.

The ultrasonographic sensor 514 performs ultrasonic imaging of the eyeball 110 of the user and preferably performs ultrasonic imaging of the crystalline lens included in the eyeball 110 to generate an ultrasonic image. When the ultrasonic image is generated by the ultrasonographic sensor 514, the eyeball measurement unit 510 can transmit the ultrasonic image to the controller 540. According to an embodiment, the eyeball measurement unit 510 can determine oblateness of the crystalline lens included in the eyeball 110 based on the ultrasonic image and generate oblateness data. Further, the eyeball measurement unit 510 can calculate the distance from the eyeball 110 of the user to the focus or plane of focus based on the oblateness data and generate distance data.

According to an embodiment, it is apparent to those skilled in the art that the eyeball measurement unit 510 can detect a change in the eyeball 110 by using both of the electromyogram sensor 512 and the ultrasonographic sensor 514. The eyeball measurement unit 510 can transmit the electromyogram signal detected by the electromyogram sensor 512 and the ultrasonic image photographed by the ultrasonographic sensor 514 to the controller 540. The controller 540 can more accurately calculate the distance from the eyeball 110 of the user to the plane of focus by using both of the electromyogram signal and the ultrasonic image.

According to an embodiment, the controller 540 can first calculate distance data by using the electromyogram signal output from the electromyogram sensor 512 and verify whether the distance data is correctly calculated by using the ultrasonic image.

The display unit 520 displays various data of the automatic focusing apparatus 500. According to an embodiment, the display unit 520 can display data stored in the memory 504 or an image input through the camera 530 by using a prepared screen. According to an embodiment, the display unit 520 can be implemented in a form including a user input unit 502, which includes a touch screen or the like, receiving a user input from the user.

In certain embodiments, when the automatic focusing apparatus 500 is implemented by the camera apparatus, the display unit 520 can further include a viewfinder 522. The viewfinder 522 is a type of optical apparatus within the camera apparatus, which allows the user to conveniently receive an image input through a lens of the camera apparatus by approaching his or her eyeball to the viewfinder 522.

Further, in the present embodiment, the automatic focusing apparatus 500 can display the focus currently set by the automatic focusing apparatus 500 through the viewfinder 522 to provide the displayed focus to the user. For example, the automatic focusing apparatus 500 can inform the user of the focus currently set by the automatic focusing apparatus 500 by displaying one position of the image displayed through the viewfinder 522 with a red point. According to an embodiment, the viewfinder 522 can blurredly or clearly display a part of the image displayed through the viewfinder 522 according to the currently set focus. That is, the viewfinder 522 can provide the image reflecting the depth of field that varies depending a position of the focus to the user. That is, the viewfinder 522 can clearly display an area including the focus and blurredly display an area which does not include the focus under a control of the controller 540.

A camera 530 receives an image through a lens (not shown). The automatic focusing apparatus 500 according to the present embodiment can include the camera 530 and the viewfinder 522 when being implemented by the camera apparatus. The camera 530 can convert the image input through the lens to an image frame. Further, the camera 530 can store the image continuously input through the lens in the unit of frames in real time or temporarily store the image. According to an embodiment, when the automatic focusing apparatus 500 is implemented by an apparatus other than the camera apparatus, the camera 530 can be omitted.

The controller 540 controls general operations of the automatic focusing apparatus 500. The controller 540 according to the present embodiment calculates the distance from the eyeball 110 to the focus or plane of focus based on the electromyogram signal detected by the electromyogram sensor 512 or calculates the distance from the eyeball 110 to the focus or plane of focus based on the ultrasonic images photographed by the ultrasonographic sensor 514. The controller 540 can generate distance data indicating the distance from the eyeball 110 to the focus and adjust the plane of focus of the image based on the generated distance data. That is, the controller 540 can reset a position of the focus of the image displayed through the display unit 520 and change the image according to the reset position.

In an embodiment, the controller 540 can include a focus plane setting unit 542 for setting or resetting the focus according to the distance from the eyeball 110 to the plane of focus. The focus plane setting unit 542 can calculate the distance from the eyeball 110 to the plane of focus based on the electromyogram signal or the ultrasonic images. Further, according to an embodiment, the focus plane setting unit 542 can determine a depth of field of the image displayed through the display unit 520.

The depth of field is an area in which the subject is clearly captured and includes at least a part of the image displayed by the display unit 520. The depth of field can include a predetermined or non-predetermined range from the focus. When the focus is reset, the focus plane setting unit 542 can reset the depth of field in the image according to the reset focus.

When the focus and the depth of field are reset, the controller 540 converts the image according to the reset focus or depth of field and displays the converted image through the display unit 520.

Figure 6A:
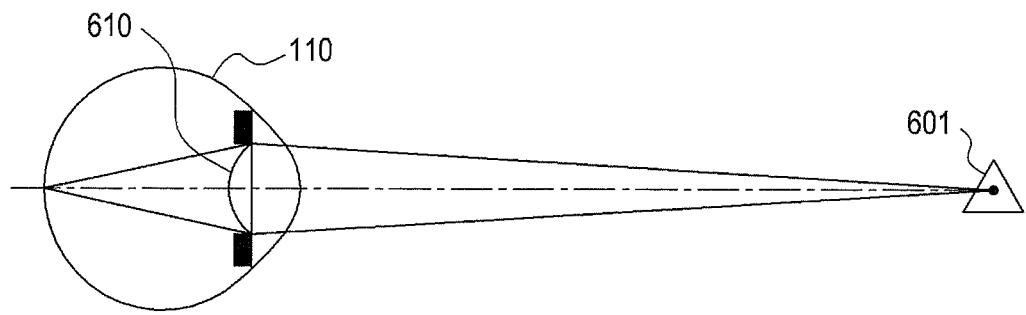
FIGS. 6A to 6C are diagrams illustrating an example of a focusing method in an automatic focusing apparatus.
Figure 6B:
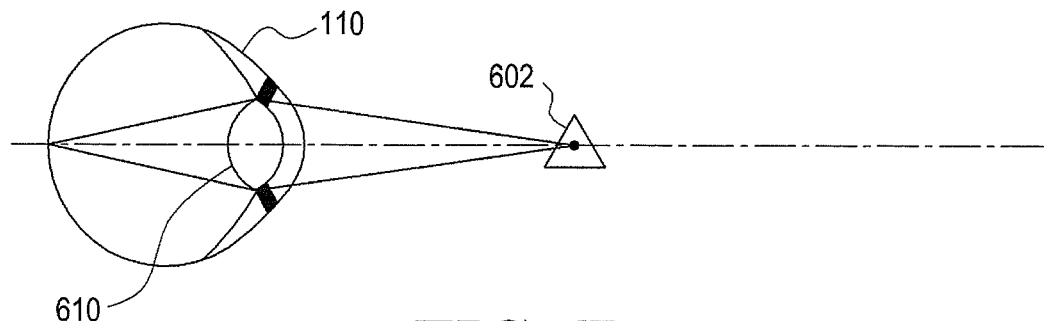
Figure 6C:
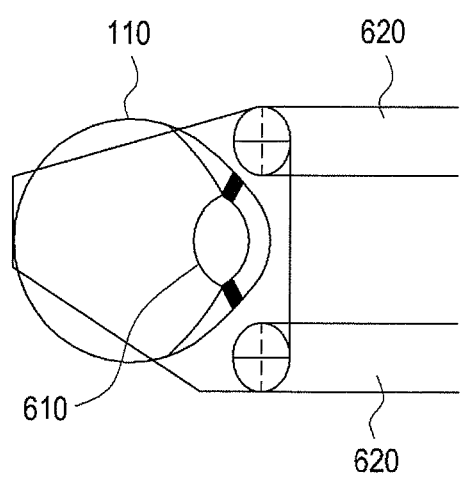

FIGS. 6A to 6C are diagrams illustrating an example of a focusing method in an automatic focusing apparatus, such as the automatic focusing apparatus shown in FIG. 5.

FIGS. 6A and 6B are diagrams illustrating an operation in which the automatic focusing apparatus 500 calculates distances from the eyeball 110 to objects 601 and 602 by using the electromyogram sensor 512.

When the automatic focusing apparatus 500 is implemented by the camera apparatus, the eyeball measurement unit 510 according to the present embodiment, that is, one or more electromyogram sensors 512 are disposed within the viewfinder 522 of the camera apparatus. When the eyeball 110 of the user approaches to the viewfinder 522, the electromyogram sensor 512 performs scaling to detect oblateness of a crystalline lens 610 included in the eyeball 110. A degree of the oblateness of the crystalline lens 610 corresponds to distances from the eyeball 110 to objects 601 and 602 focused on by the eyeball 110. Accordingly, in the present embodiment, the plane of focus can be reset through proper work of a servomechanism of the camera lens. The resetting of the plane of focus changes the image detected by the eyeball 110. The change in the detected image can be detected again, and the controller 540 can change the image again according to a result of the detection. As described above, the automatic focusing apparatus 500 according to the present disclosure can perform continuous feedback between the eyeball 110 and the automatic focusing apparatus 500 by continuously receiving the change in the focus generated by the eyeball 110.

Referring to FIG. 6A, when the focused object 604 is located in a remote position from the eyeball 110, the crystalline lens 610 included in the eyeball 110 contracts. When the crystalline lens 610 contracts, the electromyogram sensors 512 included in the eyeball measurement unit 510 can detect the contracting of the crystalline lens by detecting the electromyogram signal generated by the contracting of the crystalline lens 610. The controller 540 calculates a distance from the eyeball 110 to the object 601 based on the electromyogram signal.

Referring to FIG. 6B, when the focused object 602 is located in a close position to the eyeball 110, the crystalline lens 610 included in the eyeball 110 expands. When the crystalline lens 610 expands, the electromyogram sensors 512 included in the eyeball measurement unit 510 can detect the expansion of the crystalline lens 610 by detecting the electromyogram signal generated due to the expansion of the crystalline lens 610. The controller 540 calculates a distance from the eyeball 110 to the object 602 based on the electromyogram signal.

FIG. 6C is a diagram illustrating an operation in which the automatic focusing apparatus 500 performs ultrasonic imaging of the eyeball 110 by using the ultrasonographic sensor 514. Referring to FIG. 6C, the ultrasonographic sensor 620 performs ultrasonic imaging of the eyeball 110 including the crystalline lens 610.

Figure 7:
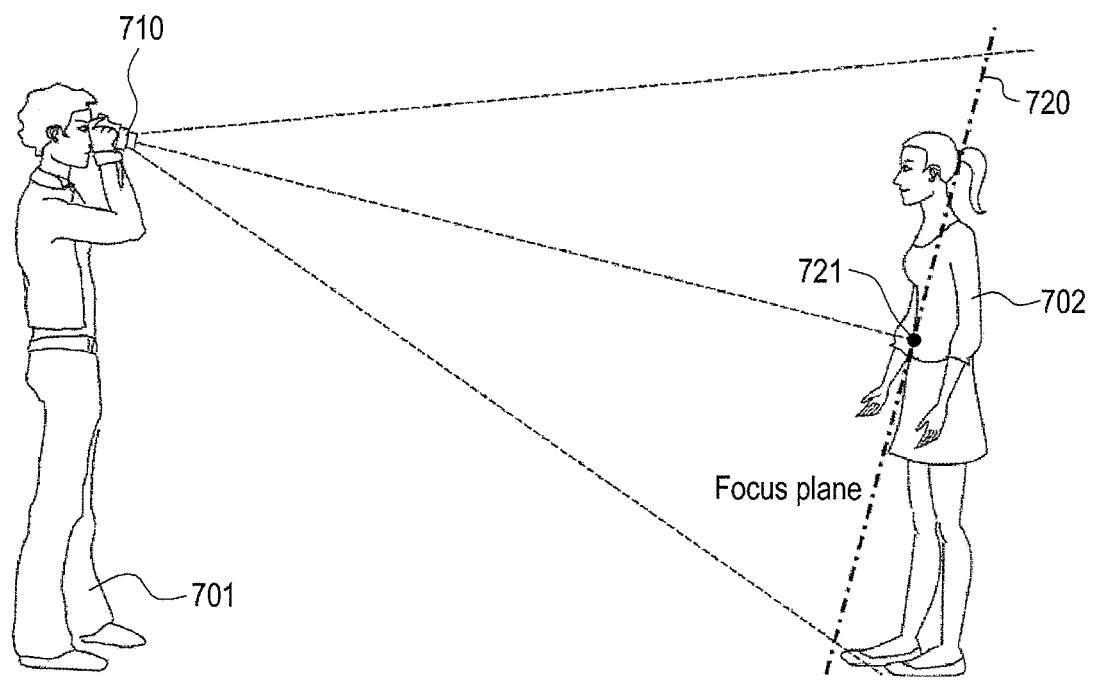
FIG. 7 illustrates another example of a focusing method in an automatic focusing apparatus.

FIG. 7 is a diagram illustrating another example of the focusing method in an automatic focusing apparatus, such as the automatic focusing apparatus shown in FIG. 5. In FIG. 7, the automatic focusing apparatus 500 of FIG. 5 is embodied by a camera apparatus 710.

Referring to FIG. 7, a user 701 photographs a subject 702 by using the camera apparatus 710. When the user approaches the eyeball 110 to the viewfinder 522 to photograph the subject 702, the camera apparatus 710 determines a focus 721. In the present embodiment, the camera apparatus 710 can calculate and determine a position at which the user 701 looks, that is, the focus 721 by using the electromyogram sensor 512 or the ultrasonographic sensor 514. Further, the camera apparatus 710 determines a plane including the focus 721 as a plane of focus 720.

As shown in FIG. 7, when the automatic focusing apparatus 500 is implemented by the camera apparatus 710, the plane of focus 720 can be formed in parallel to the lens of the camera apparatus 710. The controller 540 of the camera apparatus 710 controls the display unit 520, particularly, the viewfinder 522 such that the plane of focus 720 including the focus 721 is most clearly displayed.

Figure 8A:
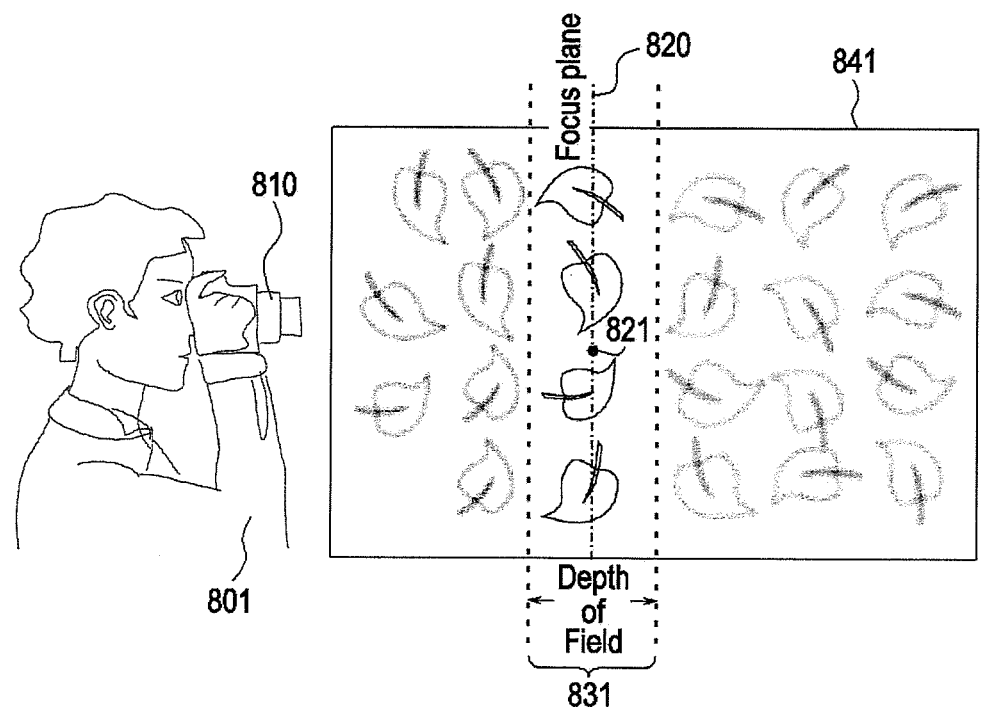
FIGS. 8A and 8B are diagrams illustrating an automatic focusing apparatus providing images that vary according to a depth of field to a user.
Figure 8B:
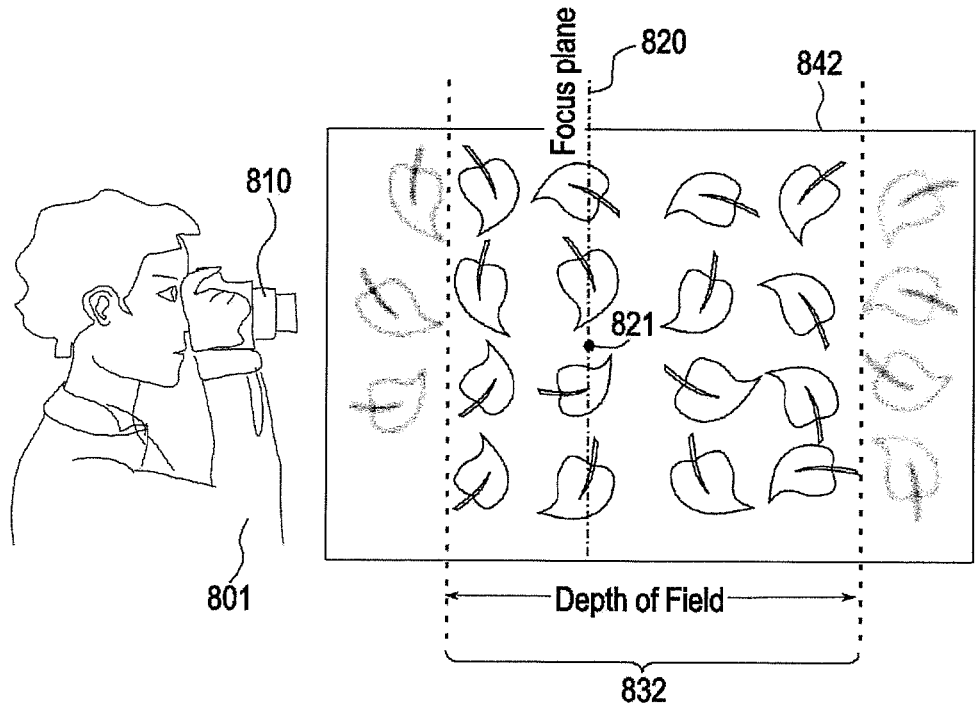

FIGS. 8A and 8B are diagrams illustrating an automatic focusing apparatus providing images that vary according to a depth of field to the user. In FIG. 8 the automatic focusing apparatus 500 of FIG. 5 is embodied by a camera apparatus 810, similar to FIG. 7.

Referring to FIGS. 8A and 8B, a user 801 photographs tree leaves by using the camera apparatus 810. FIG. 8A shows a first image 841 provided to the user by the camera apparatus 810, and FIG. 8B shows a second image 842 provided to the user by the camera apparatus 810

The first image 841 and the second image 842 are images generated by photographing the same subject. Further, the camera apparatus 810 of FIGS. 8A and 8B determine the same focus 821 and the same plane of focus 820. However, since a shallow depth of field is set to the camera apparatus 810 of FIG. 8A, only tree leaves 831 including the plane of focus 820 are clearly displayed. In contrast, since a deep depth of field is set to the camera apparatus 810 of FIG. 8B, tree leaves 832 included within a particular range of the front and the back of the plane of focus 820 are clearly displayed as well as tree leaves including the plane of focus 820. As described above, the camera apparatus 810 according to the present embodiment can provide different images according to the focus 821, a position or a range of the plane of focus 820, and the depth of field of the focus 821.

Figure 9A:
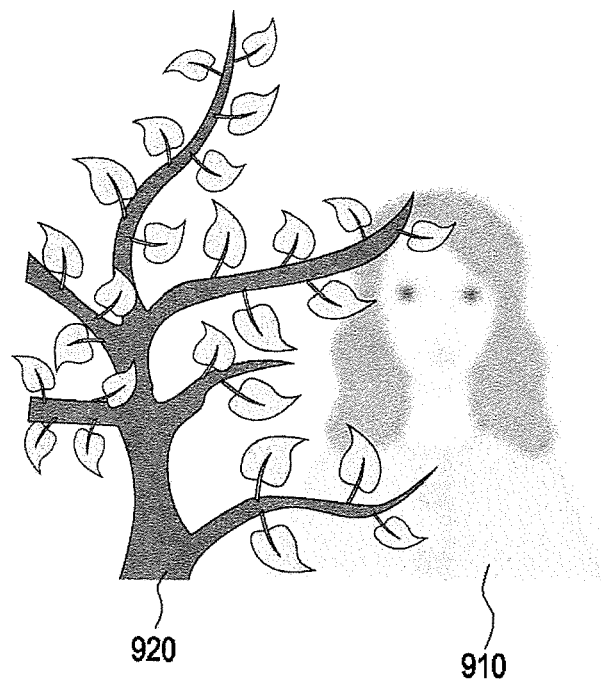
FIGS. 9A and 9B are diagrams illustrating an automatic focusing apparatus providing images that vary according to a position of a focus to a user.
Figure 9B:
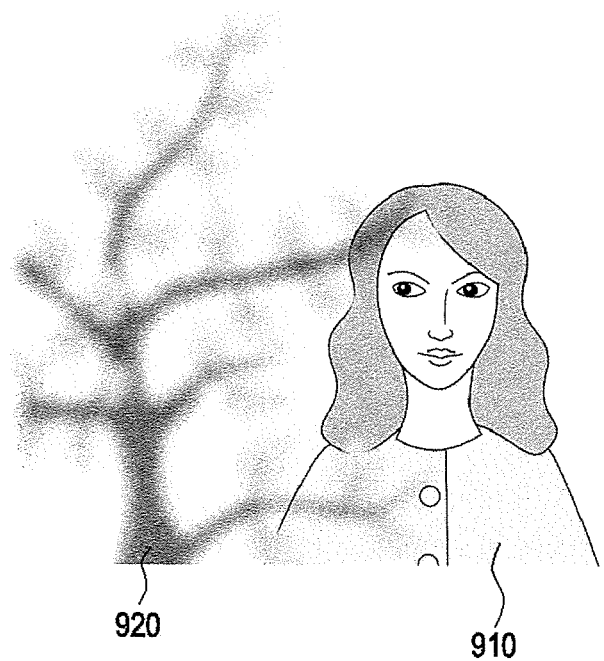

FIGS. 9A and 9B are diagrams illustrating an automatic focusing apparatus, such as the automatic focusing apparatus shown in FIG. 5, providing images that vary according to a position of the focus to the user.

FIGS. 9A and 9B illustrates an example of an image provided by the automatic focusing apparatus, and images in FIGS. 9A and 9B all include one person 910 and one tree 920.

When the user using the automatic focusing apparatus 500 looks at the tree 920, the automatic focusing apparatus 500 considers that a focus and a plane of focus are located in the tree 920 and provides an image clearly displaying the tree 920 to the user. Further the automatic focusing apparatus 500 blurredly displays the person 910 located in the back of the tree 920 to contrast with the clearly displayed tree 920 and provides the image.

When the user using the automatic focusing apparatus 500 looks at the person 910, the automatic focusing apparatus 500 considers that a focus and a plane of focus are located in the person 910 and provides an image clearly displaying the person 910 to the user. At this time, although the person 910 is behind the tree 920, the automatic focusing apparatus 500 blurredly displays the tree 920 to contrast with the clearly displayed person 910 and provides the image to the user.

Figure 10A:
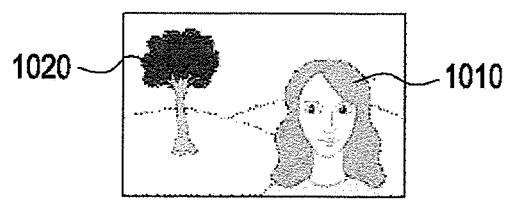
FIGS. 10A to 10C are diagrams illustrating an automatic focusing apparatus providing images that vary according to a position of a focus to a user.
Figure 10B:
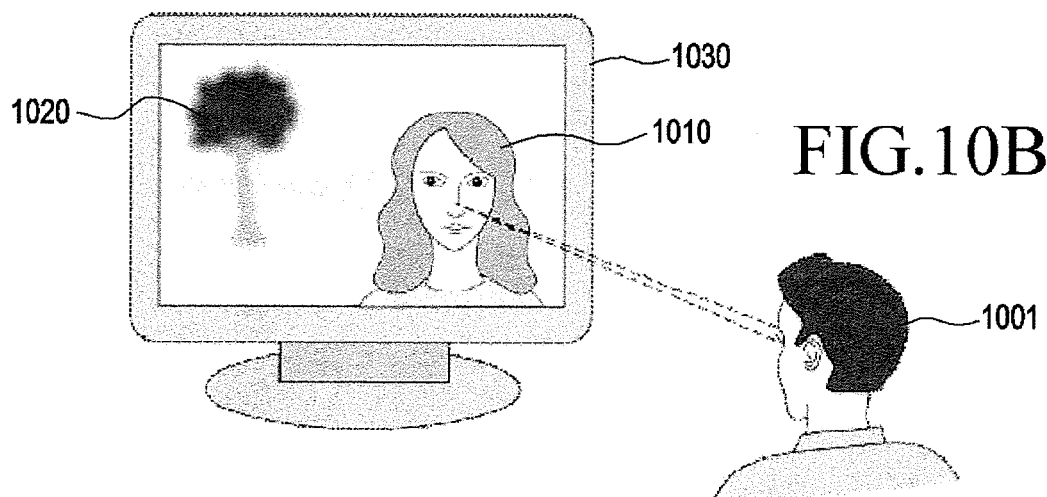
Figure 10C:
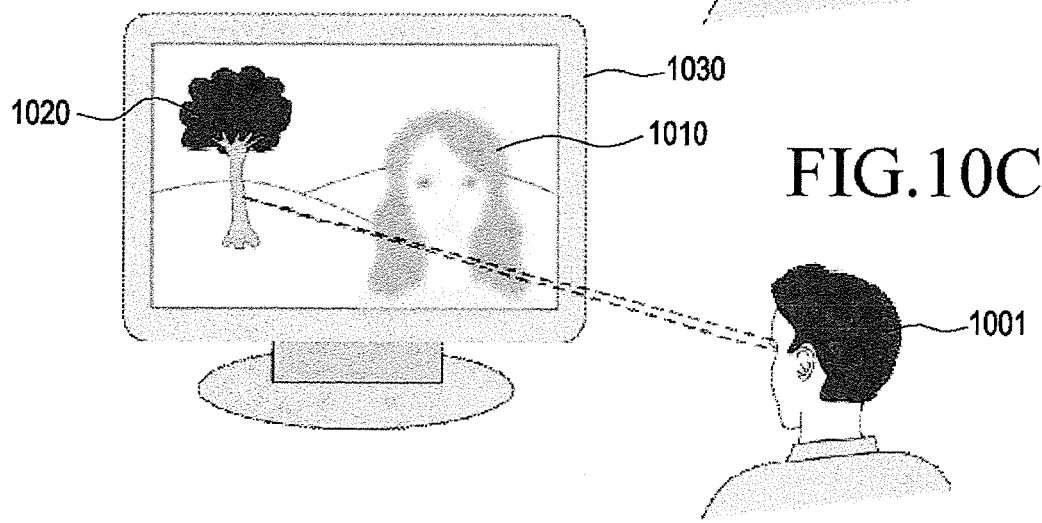

FIGS. 10A to 10C are diagrams illustrating an automatic focusing apparatus, such as the automatic focusing apparatus shown in FIG. 5, providing images that vary according to a position of the focus to the user. In FIGS. 10A to 10C, the automatic focusing apparatus 500 is embodied by a 3D image display device 1030.

FIG. 10A shows an original image of an image to be provided to a user 1001 by the 3D image display device 1030. Referring to FIG. 10A, the original image includes one person 1010 and one tree 1020.

Referring to FIG. 10B, when the user 1001 looks at the person 1010, the 3D image display device 1030 considers that a focus and a plane of focus are located in the person 1010. Accordingly, the 3D image display device 1030 provides an image clearly displaying the person 1010 to the user 1001. The 3D image display device 1030 can blurredly display the tree 1020 located in the back of the person 1010 to contrast with the clearly displayed person 1010 and provide the image to the user.

In contrast to FIG. 10B, when the user 1001 looks at the tree 1020, the 3D display device 1030 considers that the focus and the plane of focus are located in the tree 1020. Accordingly, the 3D image display device 1030 provides an image clearly displaying the tree 1020 to the user 1001. At this time, although the tree 1020 is behind the person 1010, the 3D image display device 1030 blurredly displays the person 1010 to contrast with the clearly displayed tree 1020 and provides the image to the user 1001.

As described above, the automatic focusing apparatus 500 according to the present disclosure calculates the position at which the user 1001 looks, i.e., the focus and the plane of focus, regardless of distances between the automatic focusing apparatus 500 and the objects 1010 and 1020. The automatic focusing apparatus 500 according to the present disclosure allows the user 1001 to conveniently view a desired image by providing an image clearly displaying an object mainly with the focus and the plane of focus to the user 1001 regardless of distances between the automatic focusing apparatus 500 and the objects 1010 and 1020. Further, even though the user 1001 changes the focus, the automatic focusing apparatus 500 traces the focus or the plane of focus changed by the user 1001 in real time to enable the user to view the image with a desired focus.

Figure 11:
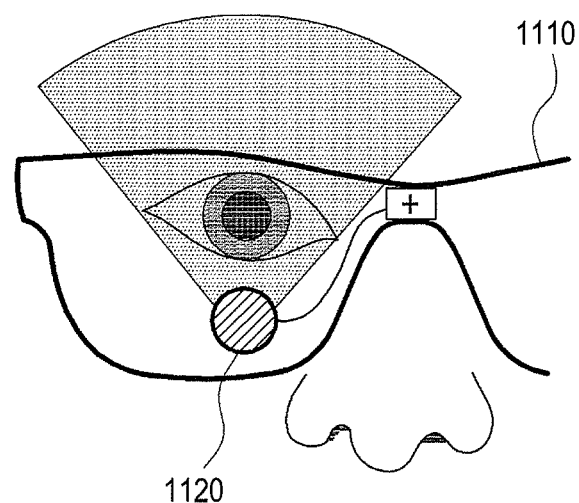
FIG. 11 is a diagram illustrating an ultrasonographic sensor for photographing an ultrasonic image of an eyeball in an automatic focusing apparatus.

FIG. 11 is a diagram illustrating an example of the ultrasonographic sensor photographing an ultrasonic image of the eyeball in an automatic focusing apparatus, such as the automatic focusing apparatus shown in FIG. 5. In FIG. 11, the automatic focusing apparatus 500 is embodied in a form of the 3D image display device.

As the automatic focusing apparatus 500 is implemented by the 3D image display device, the automatic focusing apparatus 500 can further include 3D stereoscopic glasses 1110 for providing a 3D image to the user. The 3D stereoscopic glasses 1110 have an ultrasonographic sensor 1120 therein to perform ultrasonic imaging of the eyeball of the user in real time.

According to an embodiment, the 3D stereoscopic glasses 1110 can further include a sensor (not shown) for detecting whether the user wears the 3D stereoscopic glasses 1110. When the user wears the 3D stereoscopic glasses 1110, the ultrasonographic sensor 1120 attached to the 3D stereoscopic glasses 1110 performs ultrasonic imaging of the eyeball of the user and transmits the photographed ultrasonic image to the image display device. The 3D image display device sets or resets the focus by using the ultrasonic image received from the ultrasonographic sensor 1120.

According to the present disclosure, an automatic focusing method of automatically setting a focus according to a change in an eyeball of the user and an apparatus for the same are provided.

It can be appreciated that the embodiments of the present disclosure can be implemented in software, hardware, or a combination thereof. Any such software can be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present disclosure. Therefore, embodiments of the present disclosure provide a program including codes for implementing a system or method claimed in any claim of the accompanying claims and a machine-readable device for storing such a program. Further, this program can be electronically conveyed through any medium such as a communication signal transferred via a wired or wireless connection, and embodiments of the present disclosure appropriately include equivalents thereto.

Further, the automatic focusing apparatus or at least one device included in the focusing system can receive the program from a program providing apparatus connected to the automatic focusing apparatus or the device wirelessly or through a wire and store the received program. The program providing apparatus can include a memory for storing a program containing instructions for allowing the automatic focusing apparatus or at least one device included in the focusing system to perform a preset content protecting method and information required for the content protecting method, a communication unit for performing wired or wireless communication with the portable terminal, and a controller for transmitting the corresponding program to the automatic focusing apparatus or at least one device included in the focusing system according to a request of the automatic focusing apparatus or at least one device included in the focusing system or automatically.

Although the present disclosure has been described with certain embodiments, various changes and modifications may be suggested to one skilled in the art. It is intended that the present disclosure encompass such changes and modifications as fall within the scope of the appended claims.

What is claimed is:

1. An automatic focusing method comprising:
   determining a manner for auto focusing among at least an electromyogram signal manner and an ultrasonic image manner, wherein the electromyogram signal manner comprises a manner for calculating a distance to an object based on an electromyogram signal generated from an eyeball and the ultrasonic image manner comprises a manner for calculating a distance to an object based on at least one ultrasonic image of the eyeball;
   calculating a distance from an eyeball of a user to an object at which the eyeball of the user looks according to the determined manner; and
   adjusting, based on the calculated distance, a plane of focus including the object.

2. The automatic focusing method of claim 1, wherein calculating the distance comprises:
   detecting the electromyogram signal generated from the eyeball; and
   generating distance data based on the electromyogram signal.

3. The automatic focusing method of claim 1, wherein calculating the distance comprises:
   collecting the ultrasonic images generated by ultrasonic imaging of the eyeball;
   identifying a crystalline lens of the eyeball based on the ultrasonic images;
   generating oblateness data by recognizing oblateness of the crystalline lens; and
   generating distance data based on the oblateness data.

4. The automatic focusing method of claim 1, further comprising:
   priorly providing an image including the plane of focus to the user.

5. The automatic focusing method of claim 4, wherein priorly providing the image including the plane of focus to the user comprises:
   converting the image based on the plane of focus and a preset depth of field; and
   providing the converted image to the user.

6. The automatic focusing method of claim 1, further comprising:
   receiving a user input for automatic focusing.

7. The automatic focusing method of claim 6, wherein receiving the user input comprises:
   detecting that the eyeball approaches a viewfinder.

8. The automatic focusing method of claim 6, wherein:
   determining the manner for auto focusing comprises determining that the manner is the electromyogram signal manner,
   wherein calculating the distance comprises detecting the electromyogram signal and generating distance data based on the electromyogram signal.

9. The automatic focusing method of claim 8, wherein:
   determining the manner for auto focusing comprises determining that the manner is the ultrasonic image manner; and
   calculating the distance comprises:

collecting the ultrasonic images by ultrasonic imaging of the eyeball;

identifying the crystalline lens included in the eyeball based on the ultrasonic images;

generating oblateness data by recognizing oblateness of the crystalline lens; and generating distance data based on the oblateness data.

10. An automatic focusing apparatus comprising:

an eyeball measurement unit configured to detect a change generated in an eyeball of a user; and a controller configured to:

determine a manner for auto focusing among at least electromyogram signal manner and ultrasonic image manner, wherein the electromyogram signal manner comprises a manner for calculating a distance to an object based on an electromyogram signal generated from an eyeball and the ultrasonic image manner comprises a manner for calculating a distance to an object based on at least one ultrasonic image of the eyeball;

calculate a distance from the eyeball of the user to an object at which the eyeball of the user looks according to the determined manner, and adjust, based on the calculated distance, a plane of focus including the object.

11. The automatic focusing apparatus of claim 10, wherein the eyeball measurement unit comprises an electromyogram sensor configured to detect the electromyogram signal generated from the eyeball, and the controller is configured to generate the distance data based on the electromyogram signal.

12. The automatic focusing apparatus of claim 10, wherein the eyeball measurement unit comprises an ultrasonographic sensor configured to perform ultrasonic imaging of the eyeball and collect the ultrasonic images generated by ultrasonic imaging of the eyeball, and the controller is configured to identify a crystalline lens of the eyeball based on the ultrasonic images, generates oblateness data by recognizing oblateness of the crystalline lens, and generate distance data based on the oblateness data.

13. The automatic focusing apparatus of claim 10, further comprising:

a display unit configured to priorly provide an image including the plane of focus.

14. The automatic focusing apparatus of claim 13, wherein the controller is configured to convert the image based on the plane of focus and a preset depth of field and to control the display unit to provide the converted image to the user.

15. The automatic focusing apparatus of claim 14, wherein the display unit comprises a viewfinder, and the controller is configured to determine that a user input for automatic focusing is input when it is detected that the eyeball approaches the viewfinder.

16. The automatic focusing apparatus of claim 15, wherein the controller is configured to determine that the manner for auto focusing is the electromyogram signal manner and control an electromyogram sensor that is included in the eyeball measurement unit to detect an electromyogram signal generated from the eyeball.

17. The automatic focusing apparatus of claim 16, wherein the controller is configured to determine that the manner for auto focusing is the ultrasonic image manner, and collect the ultrasonic images generated by ultrasonic imaging of the eyeball by using an ultrasonographic sensor included in the eyeball measurement unit.

18. The automatic focusing apparatus of claim 10, wherein the controller is configured to detect a user input for automatic focusing before generating the distance data.

19. The automatic focusing apparatus of claim 10, wherein the controller is configured to provide automatic focusing for an electronic device including a camera.

20. The automatic focusing method of claim 1, further comprising providing automatic focusing for an electronic device including a camera.

* * * * *